(12) United States Patent
Rowell et al.

(10) Patent No.: US 11,487,904 B2
(45) Date of Patent: Nov. 1, 2022

(54) METHODS AND SYSTEMS FOR UNDERLYING OPERATING SYSTEM SHELL DISCOVERY

(71) Applicant: Charter Communications Operating, LLC, St. Louis, MO (US)

(72) Inventors: Jeffrey Murray Rowell, Aurora, CO (US); Charles James Manser, Clearwater, FL (US)

(73) Assignee: Charter Communications Operating, LLC, St. Louis, MO (US)

( * ) Notice: Subject to any disclaimer, the term of this patent is extended or adjusted under 35 U.S.C. 154(b) by 56 days.

(21) Appl. No.: 17/076,047

(22) Filed: Oct. 21, 2020

(65) Prior Publication Data

US 2022/0121762 A1 Apr. 21, 2022

(51) Int. Cl.
| | |
|---|---|
| *G06F 21/62* | (2013.01) |
| *G06F 21/57* | (2013.01) |
| *H04L 9/40* | (2022.01) |
| *G06N 5/02* | (2006.01) |
| *H04L 41/0813* | (2022.01) |
| *H04L 41/08* | (2022.01) |
| *G06F 9/455* | (2018.01) |
| *G06F 21/00* | (2013.01) |

(52) U.S. Cl.
CPC ........ *G06F 21/629* (2013.01); *G06F 9/45512* (2013.01); *G06F 21/57* (2013.01); *G06F 21/577* (2013.01); *G06N 5/025* (2013.01); *H04L 41/0813* (2013.01); *H04L 41/0879* (2013.01); *H04L 63/0876* (2013.01); *H04L 63/101* (2013.01)

(58) Field of Classification Search
CPC ...... G06F 21/629; G06F 21/57; G06F 21/577; G06F 21/50; G06F 21/55; G06F 21/556; G06F 9/45512; G06N 5/025; H04L 63/0876
See application file for complete search history.

(56) References Cited

U.S. PATENT DOCUMENTS

| | | | |
|---|---|---|---|
| 9,847,965 B2 | 12/2017 | Hugard, IV et al. | |
| 2001/0034847 A1* | 10/2001 | Gaul, Jr. | H04L 63/1433 709/225 |
| 2009/0293128 A1* | 11/2009 | Lippmann | H04L 63/1433 707/999.1 |
| 2010/0192226 A1* | 7/2010 | Noel | H04L 41/12 726/25 |

* cited by examiner

*Primary Examiner* — Edward Zee
(74) *Attorney, Agent, or Firm* — Young Basile Hanlon & MacFarlane, P.C.

(57) ABSTRACT

Methods and systems for automated shell discovery and access. The method includes gathering, by a control server, fingerprint data for a target device for which root shell access is required, generating, by a decision tree controller, a decision tree from the gathered fingerprint data, traversing, by the decision tree controller, the decision tree to determine a path to the root shell, reporting, by the decision tree controller to the control server, a found access path, connecting, by the control server to the root shell on the target device, using one or more commands associated with the found access path, and executing, by the control server at an accessed root shell of the target device, privileged commands associated with a task.

17 Claims, 6 Drawing Sheets

US 11,487,904 B2

METHODS AND SYSTEMS FOR UNDERLYING OPERATING SYSTEM SHELL DISCOVERY

TECHNICAL FIELD

This disclosure relates to automated discovery of underlying operating system shells on network devices.

BACKGROUND

Network devices present custom and differentiable interfaces. Each of these interfaces use different or unique mechanisms for accessing privileged commands on an underlying operating system, where privileged commands or instructions include input/output commands, memory management commands, security-based commands, and the like.

A shell (sh) or a Bourne-Again shell (bash) (collectively referred to as "shell" herein) are command interpreters in an operating system such as Unix or Linux, which are programs that execute other programs. A shell provides a user an interface to the Unix or Linux system so that the user can run different commands or utilities/tools with some input data. The shell is also a programming language of its own with complete programming language constructs such as conditional execution, loops, variables, functions and many more.

Access to a shell is needed to run privileged commands. This can be an issue when a testing platform or device is used to perform automated or unsupervised testing of a network device, where execution of the testing involves executing privileged commands. For example, the testing platform can be attempting to enumerate operating system security weaknesses on the network device. When the testing platform logins to a network device for testing, the login connection does not guarantee access to a shell. A shell is not guaranteed for most core networking devices which by default drop the testing platform into a command line interface (CLI) used for configuring the network device. The problem with this is that security checks, for example, require to be run from a shell, and these security checks cannot be performed from a network device's CLI.

Although some vendors provide a means to access underlying operating system shells, the problem is that testing platforms do not have capabilities of discovering the underlying operating system shell nor know how to access the shell.

SUMMARY

Disclosed herein are methods and systems for automated discovery and access of underlying operating system shells for enhanced enumeration of operating system security weaknesses and other like assessments or tasks which require execution of privileged commands.

In implementations, the method includes gathering, by a control server, fingerprint data for a target device for which root shell access is required, generating, by a decision tree controller, a decision tree from the gathered fingerprint data, traversing, by the decision tree controller, the decision tree to determine a path to the root shell, reporting, by the decision tree controller to the control server, a found access path, connecting, by the control server to the root shell on the target device, using one or more commands associated with the found access path, and executing, by the control server at an accessed root shell of the target device, privileged commands associated with a task.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
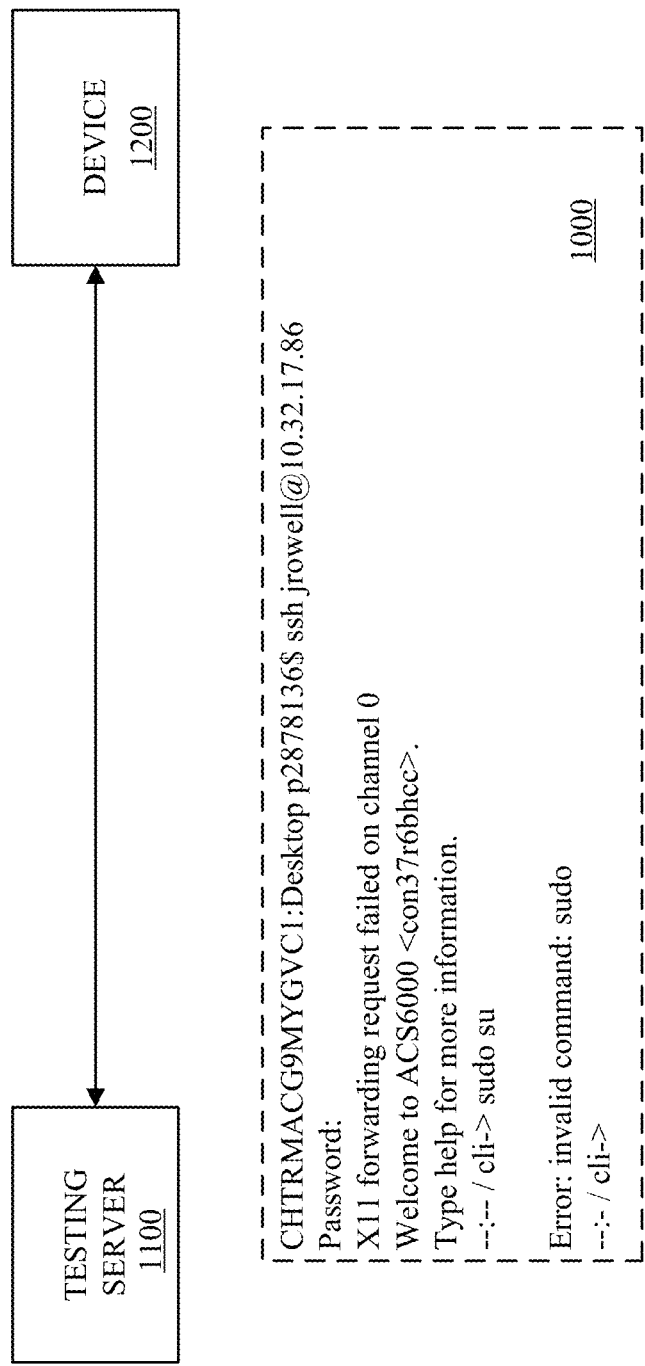
FIG. 1 is a diagram of an example execution sequence.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

FIG. 1 is a diagram of an example execution sequence 1000 between a testing server or platform 1100 and a device 1200. The testing server 1100 attempts to perform a task requiring access to an underlying operating system shell or Bourne again shell or a root shell or Bourne again shell (herein "shell") to execute or run privileged commands or instructions. At login by the testing server 1100 onto the device 1200, the device 1200 places the testing server 1100 at a command line interface (CLI). The testing server 1100 attempts to execute a sudo su command to execute privileged commands. As the testing server 1100 is only at the CLI and not a shell interface, the sudo su command is an invalid command. Consequently, the task being run by the testing server 1100 is ignored, a false result is returned, or other like problematic response.

Described herein are methods and systems for automated discovery and access of an underlying operating system shell. In an implementation, the described techniques provide a mechanism for discovering underlying operating system shells or root shells on devices, such as network devices. The mechanisms detect and find privileged access modes on the network devices without knowledge of the network device type. The mechanisms use network device fingerprint information to automatically determine the underlying operating system shell or root shell.

In implementations, an automated discovery and access of root shell system can generate a decision tree using collected device fingerprint information. Each node in the decision tree represents a command or instruction generated based on the collected device fingerprint information. The system can traverse paths on the decision tree by executing the command(s) associated with the nodes and then proceed accordingly. Detected or identified paths which provide access to the underlying operating system shell or root shell on the device are then used by the system to login to device. The system can then execute the privileged commands associated with a task, such as for example, enumeration of operating system security weaknesses.

In implementations, the described techniques uses an automated method for discovering network device commands which provides a vendor-independent technique for running privileged commends on a detected underlying operating system shell or root shell.

Figure 2:
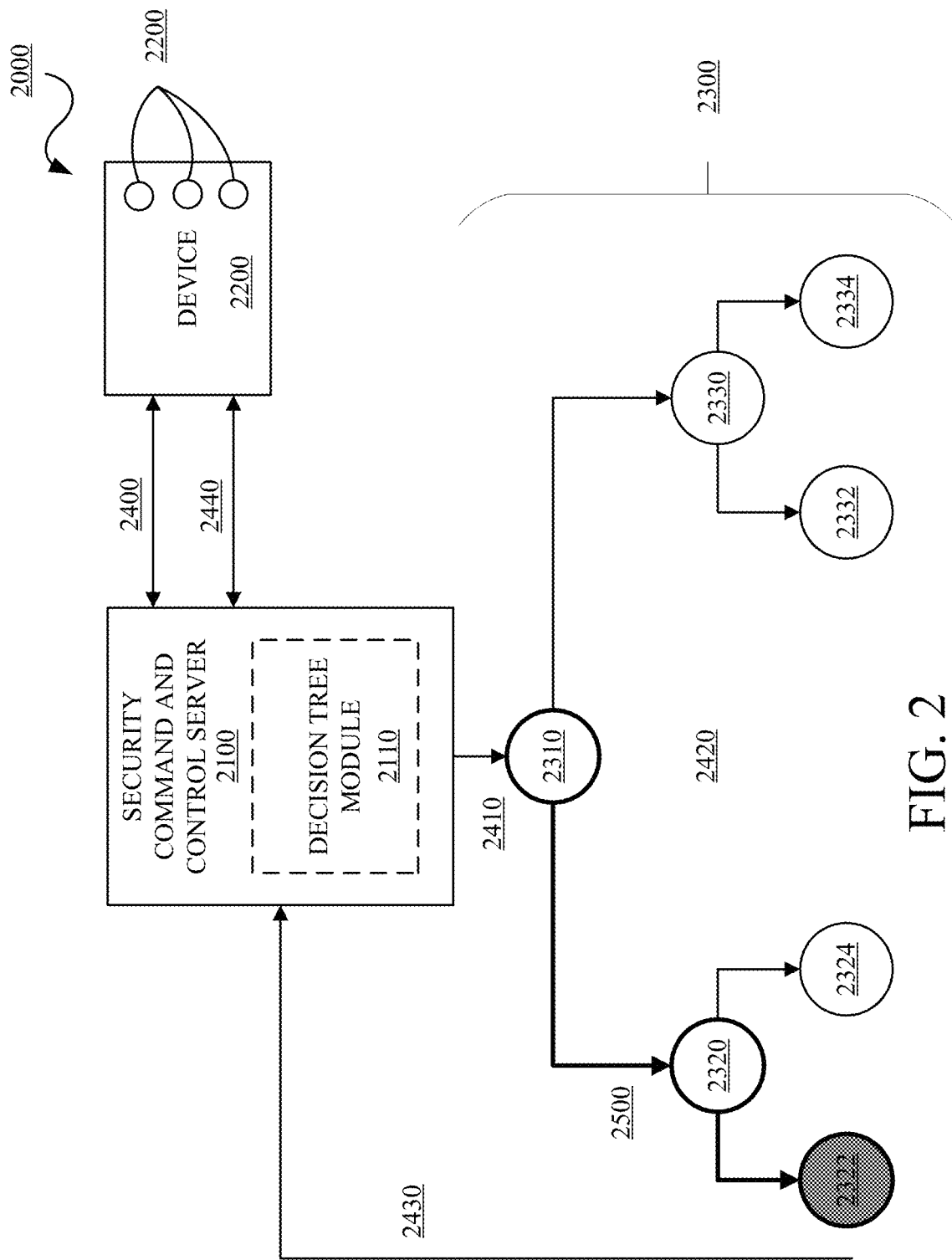
FIG. 2 is a diagram of an example flow diagram of automated discovery and access of underlying operating system shell in accordance with embodiments of this disclosure.

FIG. 2 is a diagram of an example flow 2000 of automated discovery and access of underlying operating system shell in accordance with embodiments of this disclosure. The flow 2000 describes communications and events with respect to a security command and control server 2100 and a device 2200. The security command and control server 2100 can include a decision tree module 2110. The security command and control server 2100 and the device 2200 can be in communication with or connected to each other (collectively "connected to") using wired, wireless, or combinations thereof. The components herein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The security command and control server 2100 and the device 2200 controls and manages the automated discovery and access of shells methods and techniques described herein. In implementations, the security command and control server 2100 can run security vulnerability tests against devices to scan for potential or existing weaknesses. The security command and control server 2100 is an example control server and other control servers can be used without departing from the scope of the specification or the claims.

The security command and control server 2100 obtains fingerprint data from the device 2200 including, but not limited to, telemetry data, network telemetry data, configuration information, and the like, receives a detected path from the decision tree module 2110, logins to the shell on the device 2200 using commands associated with the detected path, and executes the security tasks.

The decision tree module 2110 can generate a decision tree 2300 based on the fingerprint data received from the security command and control server 2100. Nodes 2310, 2320, 2322, 2324, 2330, 2332, 2334, and the like in the decision tree 2300 are commands which are based on the fingerprint data received from the security command and control server 2100. The decision tree module 2110 traverse different paths or branches in the decision tree 2300 by executing the commands at the nodes 2310, 2320, 2322, 2324, 2330, 2332, 2334, and the like. The decision tree module 2110 determines a next node based on executing the command at a higher level node. The decision tree module 2110 reports each path (which consists of a series of commands) to the security command and control server 2100 that results in access to the shell on the device 2200. In implementations, the decision tree module 2110 can be an application or software implemented as or on a computer, computing device, computing platform, and the like, provided as a service, and/or combinations thereof. In implementations, the decision tree module 2110 is integrated with the security command and control server 2100. In implementations, the security command and control server 2100 runs or invokes the decision tree module 2110 to determine the shell.

The device 2200, can be, but are not limited to, network devices, telecommunication equipment, routers, network switches, gateways, access gateways, and the like that that enable users to access services in various premises over wired and/or wireless communication interfaces and connections. In implementations, each of the devices 2200 may include access ports 2210 which connect to a network and/or telecommunication equipment, end user devices, mobile devices, laptops, computing devices, media devices, and the like.

Operationally, the security command and control server 2100 can attempt to execute a command on the device 2200 to access a shell or run a privileged command. In the event of a non-responsive communication, the security command and control server 2100 can gather fingerprint data of the device 2200 (2400). The fingerprint data can be used by the decision tree module 2110 to dynamically generate or build the decision tree 2300 (2410). The decision tree module 2110 can navigate the decision tree 2300 by executing commands at each node 2310, 2320, 2322, 2324, 2330, 2332, 2334, and the like (2420). In this instance, a detected path 2500 can lead to a shell, where the detected path 2500 includes the commands at nodes 2310, 2320, and 2322. The decision tree module 2110 can report the detected path 2500 to the security command and control server 2100 (2430). The security command and control server 2100 can login to the device 2200 using the commands or sequence of commands associated with the detected path (2440). The security command and control server 2100 can then perform the task requiring the shell access, for example, scanning of security vulnerabilities.

Figure 3:
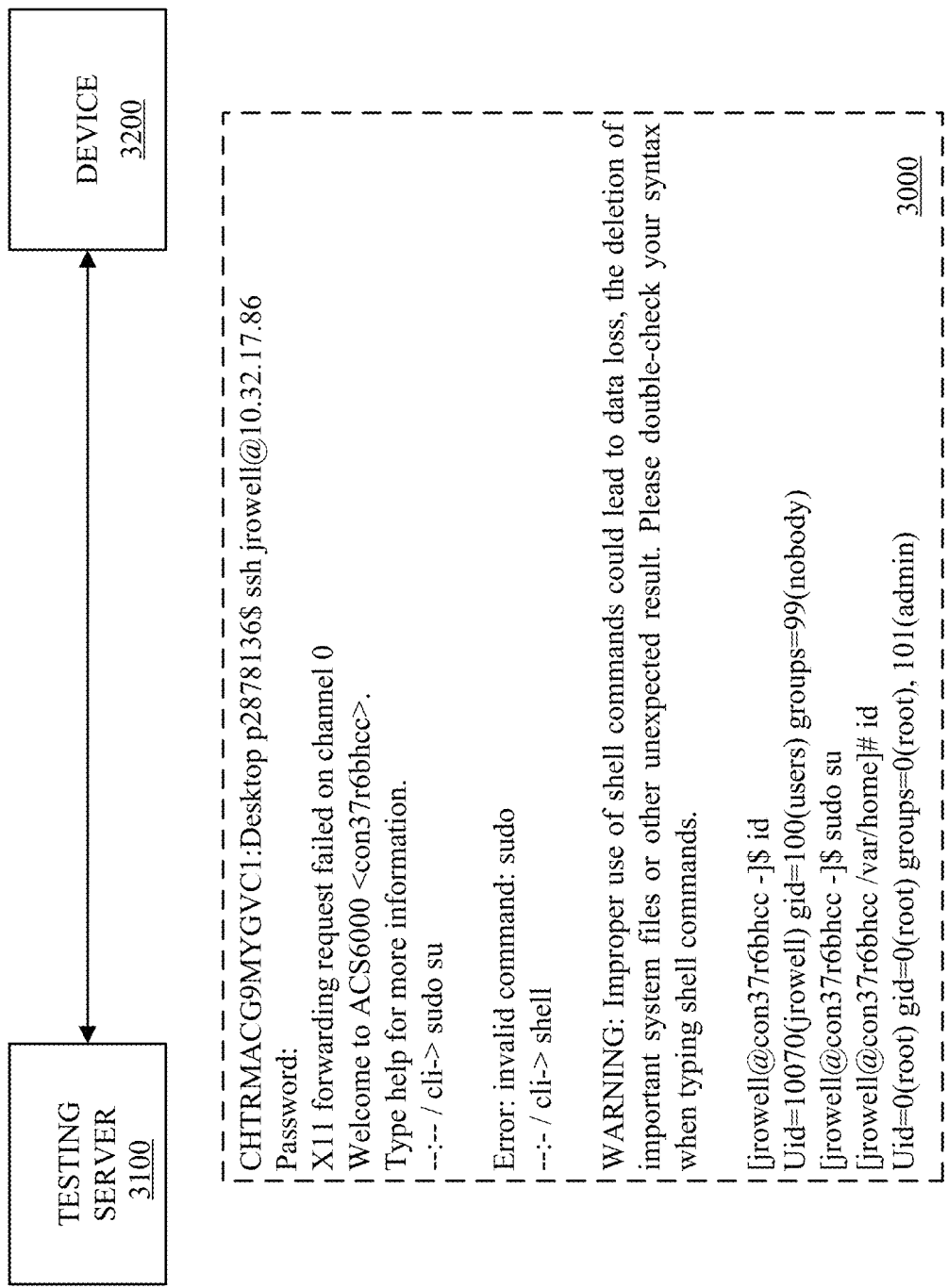
FIG. 3 is a block diagram of an example execution sequence in accordance with embodiments of this disclosure.

FIG. 3 is a block diagram of an example execution sequence 3000 between a testing server 3100 and a device 3200 in accordance with embodiments of this disclosure. The testing server 3100 attempts to perform a task requiring access to a shell to execute or run privileged commands or instructions. At login by the testing server 3100 onto the device 3200, the device 3200 places the testing server 3100 at a CLI. The testing server 3100 attempts to execute a sudo su command to execute privileged commands. As the testing server 3100 is only at the CLI and not a shell interface, the sudo su command is an invalid command. The testing server 3100 automatically executes the automated shell discovery and access as described herein to determine the shell for the device 3200. This can include, for example, gathering device fingerprint data, generating a decision tree where nodes are commands to be executed, traversing the decision tree to find paths to the shell (where a path is a sequence of commands), and logging in using the detected shell. The testing server 3100 then executes the sudo su command again to execute the privileged commands associated with the task.

Figure 4:
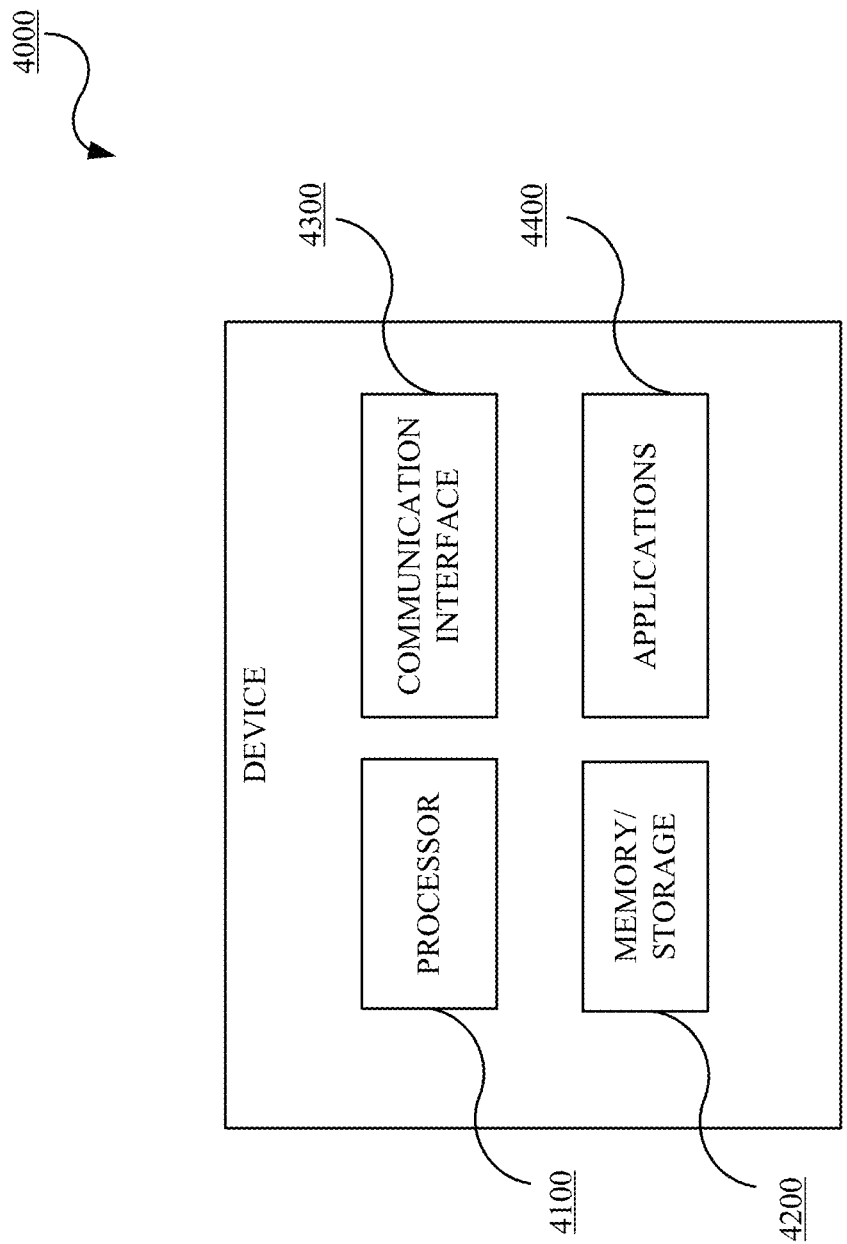
FIG. 4 is a block diagram of an example device in accordance with embodiments of this disclosure.

FIG. 4 is a block diagram of an example of a device 4000 in accordance with embodiments of this disclosure. The device 4000 may include, but is not limited to, a processor 4100, a memory/storage 4200, a communication interface 4300, and applications 4400. The device 4000 may include or implement, for example, the control server 2100, the device 2200, the decision tree module 2110, the testing server 3100, and the device 3200. The applications can be, but not limited to, the decision tree module 2110, and the like. In an implementation, appropriate memory/storage 4200 may store the fingerprint data, the commands at each node, and the like. In an implementation, appropriate memory/storage 4200 is encoded with instructions for at least controlling and managing the automated shell discovery and access methods and techniques described herein. The automated shell discovery and access techniques or methods described herein may be stored in appropriate memory/storage 4200 and executed by the appropriate processor 4100 in cooperation with the memory/storage 4200, the communications interface 4300, and applications 4400, as appropriate. The device 4000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 5:
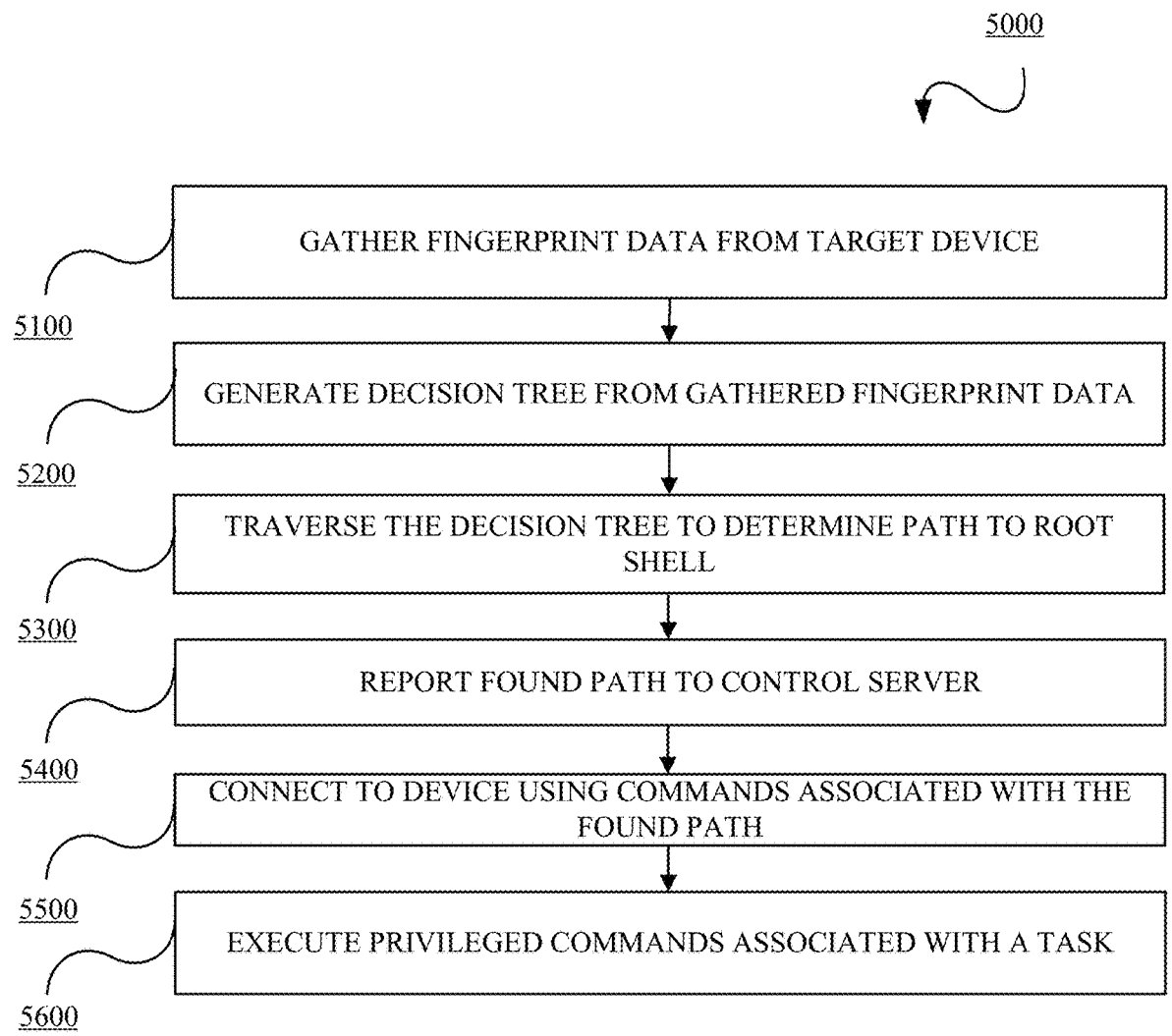
FIG. 5 is a flowchart of an example method automated discovery and access of a root shell in accordance with embodiments of this disclosure.

FIG. 5 is a flowchart of an example method 5000 for automated discovery and access in accordance with embodiments of this disclosure. The method 5000 includes: gathering 5100 fingerprint data for a target device; generating 5200 a decision tree from the gathered fingerprint data; traversing 5300 the decision tree to determine path to root shell; reporting 5400 found path to control server; connecting 5500 to the target device using commands associated with the found path; and executing 5600 privileged commands associated with a task. For example, the method 5000 may be implemented, as applicable and appropriate, by the control server 2100, the device 2200, the decision tree module 2110, the testing server 3100, and the device 3200, the processor 4100, the memory/storage 4200, the communication interface 4300, and the applications 4400.

The method 5000 includes gathering 5100 fingerprint data for a target device. A user or automated system on a control or testing server initiates performance of a task which requires access at the target device at a shell level to perform privileged commands or instructions. In an instance, when a control server fails to access the shell, an automated shell discovery and access process is initiated. The automated shell discovery and access process starts by gathering fingerprint data for the device. The fingerprint data can include data collected over a network and data collected locally from the device based on non-shell login.

The method 5000 includes generating 5200 a decision tree from the gathered fingerprint data. The fingerprint data can be used to determine commands with which to access the shell on the target device. These potential commands are used as nodes in a decision tree.

The method 5000 includes traversing 5300 the decision tree to determine path to root shell. Command(s) are executed at a node. Based on the result, a branch is taken on the decision tree to a next node. A command is executed at the next node. This process is iterated until a shell is detected, which results in a found path. In implementations, multiple paths can be determined or found. Each path is a sequence of commands.

The method 5000 includes reporting 5400 found path(s) to control server. Results from traversing the decision tree are forwarded to a login process, routine, or module.

The method 5000 includes connecting 5500 to the target device using commands associated with the found path. The control server logs in and accesses the shell using a found path.

The method 5000 includes executing 5600 privileged commands associated with a task. Once the shell is accessed, the control server executes the privileged commands for the task. Results from the task can be reported, can be used to configure the device, or combinations thereof.

Figure 6:
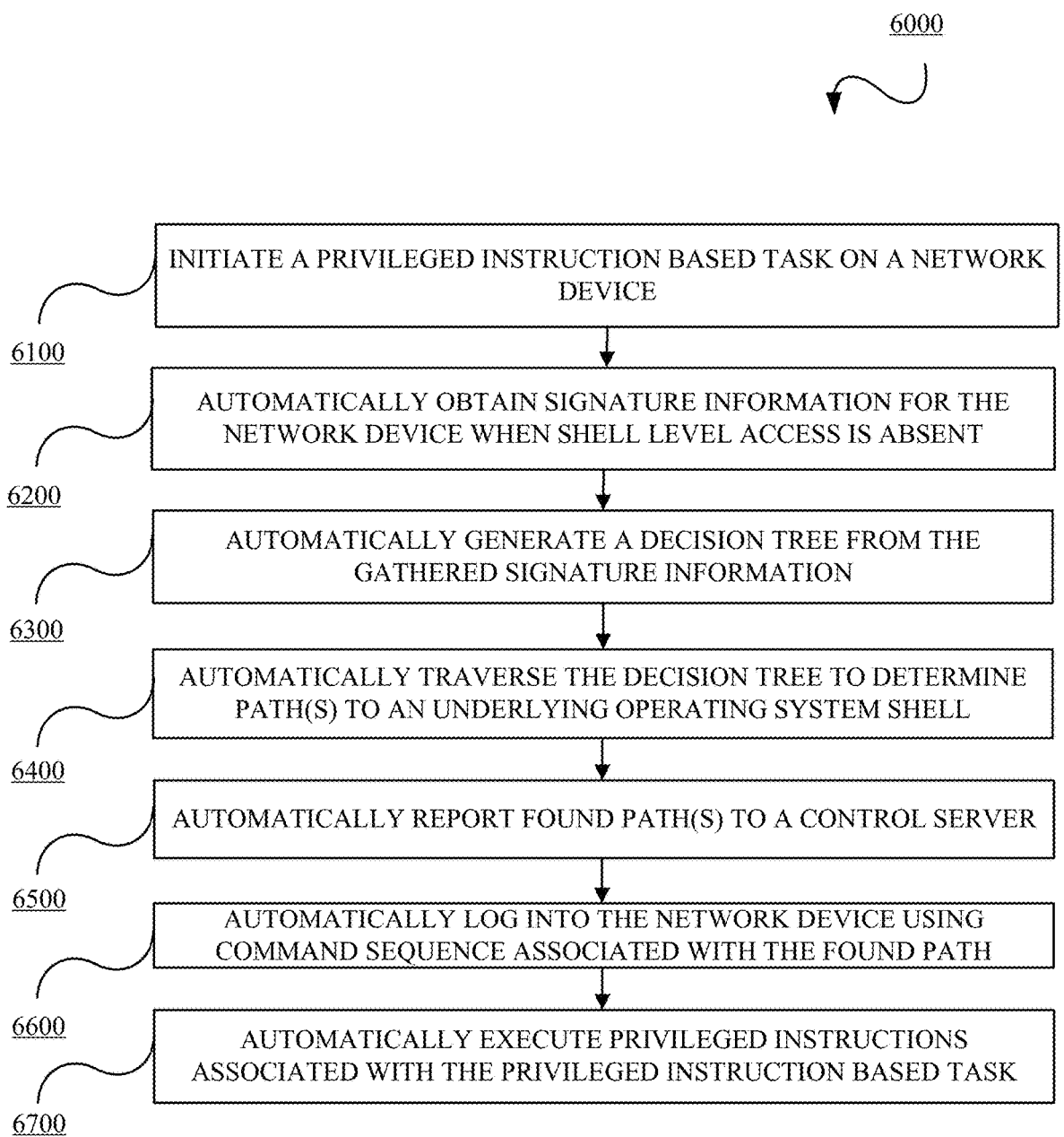
FIG. 6 is a flowchart of an example method automated discovery and access of a root shell in accordance with embodiments of this disclosure.

FIG. 6 is a flowchart of an example method 6000 for automated shell discovery and access in accordance with embodiments of this disclosure. The method 6000 includes: initiating 6100 a privileged instruction based task on a network device; automatically obtaining 6200 signature information for the network device when shell level access is absent; automatically generating 6300 a decision tree from the gathered signature information; automatically traversing 6400 the decision tree to determine path(s) to an underlying operating system shell; automatically reporting 6500 found path(s) to a control server; automatically logging 6600 into the network device using command sequence associated with the found path; and automatically executing 6700 privileged instructions associated with the privileged instruction based task. For example, the method 6000 may be implemented, as applicable and appropriate, by the control server 2100, the device 2200, the decision tree module 2110, the testing server 3100, and the device 3200, the processor 4100, the memory/storage 4200, the communication interface 4300, and the applications 4400.

The method 6000 includes initiating 6100 a privileged instruction based task on a network device. A user or automated system on a control or testing server initiates performance of a task which requires access at the target device at a shell level to perform privileged commands or instructions.

The method 6000 includes automatically obtaining 6200 signature information for the network device when shell level access is absent. In an instance, when a control server fails to access the shell, an automated shell discovery and access process is initiated. The automated shell discovery and access process starts by obtaining signature information for the device. The fingerprint data can include data collected over a network and data collected locally from the device based on non-shell login.

The method 6000 includes automatically generating 6300 a decision tree from the gathered signature information. The signature information can be used to determine commands with which to access the shell on the target device. These potential commands are used as nodes in a decision tree.

The method 6000 includes automatically traversing 6400 the decision tree to determine path(s) to an underlying operating system shell. Command(s) are executed at a node. Based on the result, a branch is taken on the decision tree to a next node. A command is executed at the next node. This process is iterated until a shell is detected, which results in a found path. In implementations, multiple paths can be determined or found. Each path is a sequence of commands.

The method 6000 includes automatically reporting 6500 found path(s) to a control server. Results from traversing the decision tree are forwarded to a login process, routine, or module.

The method 6000 includes automatically logging 6600 into the network device using command sequence associated with the found path. The control server logs in and accesses the shell using a found path.

The method 6000 includes automatically executing 6700 privileged instructions associated with the privileged instruction based task. Once the shell is accessed, the control server executes the privileged instructions for the privileged instruction based task. Results from the task can be reported, can be used to configure the device, or combinations thereof.

In general, a method for automated shell discovery and access includes gathering, by a control server, fingerprint data for a target device for which root shell access is required, generating, by a decision tree controller, a decision tree from the gathered fingerprint data, traversing, by the decision tree controller, the decision tree to determine a path to the root shell, reporting, by the decision tree controller to the control server, a found access path, connecting, by the control server to the root shell on the target device, using one or more commands associated with the found access path, and executing, by the control server at an accessed root shell of the target device, privileged commands associated with a task. In implementations, the gathering is in response to failing to access the root shell upon initial login with the target device to perform the task. In implementations, the fingerprint data includes at least telemetry data, network telemetry data, target device port data, and configuration information. In implementations, the gathering further includes gathering network based fingerprint data, and gathering fingerprint data local to the target device. In implementations, the decision tree includes a plurality of nodes and each node is a command based on the gathered fingerprint data. In implementations, each found access path is a sequence of commands. In implementations, the method further includes configuring the target device based on an outcome of the task.

In general, a method for automated shell discovery and access includes initiating, by a testing platform, a privileged instruction based task on a network device, automatically obtaining, by a decision tree module, signature information for the network device when an underlying operating system shell level access is absent, automatically generating, by the decision tree module, a decision tree from the gathered signature information, automatically promulgating, by the decision tree module, through the decision tree to determine a path to the underlying operating system shell, automatically reporting, by the decision tree module to the testing platform, each viable path, automatically logging, by the testing platform, into the network device using a command sequence associated with a viable path, and automatically executing, by the testing platform, privileged instructions associated with the privileged instruction based task. In implementations, the automatically obtaining is in response to failing to access the underlying operating system shell upon initial login. In implementations, the signature information includes at least telemetry data, network telemetry data, network device port data, and configuration information. In implementations, the automatically obtaining further includes automatically obtaining network based signature information, and automatically obtaining signature information local to the target device. In implementations, the decision tree includes a plurality of nodes and each node is a command based on the gathered signature information. In implementations, each viable path is a command sequence. In implementations, the method further includes configuring the network device based on an outcome of the task.

In general, a system includes a testing controller and a discovery module in connection with the testing controller. The discovery module configured to collect fingerprint information for a network device for which root shell access is required, generate a decision tree from the gathered fingerprint information, traverse the decision tree to determine a path to the root shell, and report a found access path to the testing controller. The testing controller configured to connect to the root shell on the target device using one or more commands associated with the found access path and execute, at an accessed root shell of the target device, privileged commands associated with a task. In implementations, the testing controller is further configured to automatically initiate the discovery module to determine access to the root shell when the testing controller fails to initially execute the task. In implementations, the fingerprint information includes at least telemetry data, network telemetry data, target device port data, and configuration information. In implementations, the decision tree includes a plurality of nodes and each node is a command based on the gathered fingerprint information. In implementations, each found access path is a sequence of commands. In implementations, the testing controller is further configured to configure the network device based on an outcome of the task.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for automated shell discovery and access, the method comprising:
    gathering, by a control server, fingerprint data for a target device for which access to a root shell is required;
    generating, by a decision tree controller, a decision tree from the gathered fingerprint data;
    traversing, by the decision tree controller, the decision tree to determine a path to the root shell;
    reporting, by the decision tree controller to the control server, a found access path;
    connecting, by the control server to the root shell on the target device, using one or more commands associated with the found access path; and
    executing, by the control server at the connected root shell of the target device, privileged commands associated with a task,
    wherein the gathering is in response to failing to access the root shell upon initial login with the target device to perform the task.

2. The method of claim 1, wherein the fingerprint data includes at least telemetry data, network telemetry data, target device port data, and configuration information.

3. The method of claim 1, wherein the gathering further comprises:
    gathering network based fingerprint data; and
    gathering fingerprint data local to the target device.

4. The method of claim 1, wherein the decision tree includes a plurality of nodes and each node is a command based on the gathered fingerprint data.

5. The method of claim 1, wherein each found access path is a sequence of commands.

6. The method of claim 1, further comprising:
    configuring the target device based on an outcome of the task.

7. A method for automated shell discovery and access, the method comprising:
    initiating, by a testing platform, a privileged instruction based task on a network device;
    automatically obtaining, by a decision tree module, signature information for the network device when an underlying operating system shell level access is absent, wherein the signature information includes at least telemetry data, network telemetry data, network device port data, and configuration information;
    automatically generating, by the decision tree module, a decision tree from the obtained signature information;
    automatically promulgating, by the decision tree module, through the decision tree to determine a path to the underlying operating system shell;
    automatically reporting, by the decision tree module to the testing platform, each viable path;
    automatically logging, by the testing platform, into the network device using a command sequence associated with a viable path; and
    automatically executing, by the testing platform at the logged-in network device, privileged instructions associated with the privileged instruction based task.

8. The method of claim 7, wherein the automatically obtaining is in response to failing to access the underlying operating system shell upon initial login.

9. The method of claim 7, wherein the automatically obtaining further comprises:
    automatically obtaining network based signature information; and
    automatically obtaining signature information local to the network device.

10. The method of claim 7, wherein the decision tree includes a plurality of nodes and each node is a command based on the obtained signature information.

11. The method of claim 7, wherein each viable path is a command sequence.

12. The method of claim 7, further comprising:
    configuring the network device based on an outcome of the task.

13. A system comprising:
    a testing controller; and
    a discovery module in connection with the testing controller,
    wherein the testing controller is configured to automatically initiate the discovery module to determine access to a root shell for a network device when the testing controller fails to initially execute a task,
    wherein the discovery module is configured to:
        collect fingerprint information for the network device for which access to the root shell is required;
        generate a decision tree from the collected fingerprint information;
        traverse the decision tree to determine a path to the root shell; and
        report a found access path to the testing controller; and
    wherein the testing controller is configured to:
        connect to the root shell on the target device using one or more commands associated with the found access path; and
        execute, at the connected root shell of the target device, privileged commands associated with the task.

14. The system of claim 13, wherein the fingerprint information includes at least telemetry data, network telemetry data, target device port data, and configuration information.

15. The system of claim 14, wherein the decision tree includes a plurality of nodes and each node is a command based on the collected fingerprint information.

16. The system of claim 15, wherein each found access path is a sequence of commands.

17. The system of claim 16, wherein the testing controller is further configured to configure the network device based on an outcome of the task.

* * * * *